US008866605B2

(12) United States Patent
Gibson

(10) Patent No.: US 8,866,605 B2
(45) Date of Patent: Oct. 21, 2014

(54) ANIMAL MONITORING SYSTEM

(75) Inventor: David John Michael Gibson, Wellington (NZ)

(73) Assignee: Say Systems Ltd, Wellington (NZ)

( * ) Notice: Subject to any disclaimer, the term of this patent is extended or adjusted under 35 U.S.C. 154(b) by 862 days.

(21) Appl. No.: 12/299,905

(22) PCT Filed: May 9, 2007

(86) PCT No.: PCT/NZ2007/000102
§ 371 (c)(1),
(2), (4) Date: Nov. 6, 2008

(87) PCT Pub. No.: WO2007/129917
PCT Pub. Date: Nov. 15, 2007

(65) Prior Publication Data
US 2010/0289639 A1   Nov. 18, 2010

(30) Foreign Application Priority Data
May 10, 2006  (NZ) ........................................ 554882

(51) Int. Cl.
*G08B 1/08* (2006.01)
*A01K 29/00* (2006.01)
*A01K 11/00* (2006.01)

(52) U.S. Cl.
CPC ............. *A01K 29/005* (2013.01); *A01K 11/006* (2013.01); *A01K 29/00* (2013.01)
USPC ................ 340/539.1; 340/573.1; 340/539.13; 600/300

(58) Field of Classification Search
CPC .................................................... A01K 11/004
USPC .......... 340/572.1–572.8, 539.1, 539.13, 10.1, 340/573.1; 600/300
See application file for complete search history.

(56) References Cited

U.S. PATENT DOCUMENTS

| 4,617,876 | A  | * | 10/1986 | Hayes ........................... 119/842 |
| 5,499,626 | A  | * | 3/1996  | Willham et al. ............... 600/300 |
| 5,900,818 | A  | * | 5/1999  | Lemnell ..................... 340/573.3 |
| 6,115,679 | A  | * | 9/2000  | Rutter et al. .................. 702/187 |
| 6,346,885 | B1 | * | 2/2002  | Curkendall ................ 340/572.4 |
| 6,405,672 | B1 | * | 6/2002  | De Mol et al. ............. 119/14.15 |
| 6,917,291 | B2 | * | 7/2005  | Allen ........................ 340/572.1 |
| 7,026,939 | B2 | * | 4/2006  | Letkomiller et al. ....... 340/572.7 |
| 7,062,308 | B1 | * | 6/2006  | Jackson ........................ 600/361 |
| 7,350,481 | B2 | * | 4/2008  | Bar-Shalom .................. 119/859 |

(Continued)

OTHER PUBLICATIONS

WO 2005101273 A1 Atkin K D et al. System useful for intensive management of animals, e.g. sheep comprises animal identification means, device for measuring parameters of animals, processor and means for implementing strategies 20051027.*

*Primary Examiner* — Eric M Blount
(74) *Attorney, Agent, or Firm* — Bio Intellectual Property Services LLC (Bio IPS). O. (Sam) Zaghmout

(57) ABSTRACT

Disclosed is an animal monitoring system that collects data regarding an animal and/or an animal's environment and enables access to the collected animal monitoring data. The system comprises a data-logger unit attached to an animal, that logs data regarding the animal or its environment; a data-relay for relaying the data to a data-storage means that collects the data; and a website that provides access to the collected data.

24 Claims, 3 Drawing Sheets

(56) References Cited

U.S. PATENT DOCUMENTS

| | | |
|---|---|---|
| 8,398,560 B2* | 3/2013 | Elser .............................. 600/534 |
| 2002/0010390 A1* | 1/2002 | Guice et al. ................... 600/300 |
| 2002/0158765 A1* | 10/2002 | Pape et al. .................. 340/573.3 |
| 2003/0122677 A1* | 7/2003 | Kail, IV ..................... 340/573.1 |
| 2007/0143438 A1* | 6/2007 | Citrin et al. ................... 709/217 |
| 2007/0288249 A1* | 12/2007 | Rowe et al. ................. 340/573.1 |
| 2010/0030036 A1* | 2/2010 | Mottram et al. .............. 600/301 |

* cited by examiner

ANIMAL MONITORING SYSTEM

FIELD OF THE INVENTION

The present invention relates to an animal-monitoring system. More particularly but not exclusively the present invention relates to an animal monitoring system that provides access to information on a website.

BACKGROUND TO THE INVENTION

There are many prior art systems and methods of monitoring animals. A particular group of these systems are those that identify an animal upon approaching a certain location. After a system has identified an animal, a frequent objective is to measure the weight of the animal at affixed location, such as disclosed in the documents WO98/47351, U.S. Pat. Nos. 4,617,876, 5,988,106, 4,517,923, 4,920,923, and US2004/199275. Measuring the weight of the animals provides the system with information for controlling the feed intake of the individual animals in order to increase feed efficiency. Another related measurement is milk production, such as disclosed in U.S. Pat. No. 4,517,923, which is likewise used to optimise productivity.

An analysis of a particular property of the individual animals over a series of time is used in U.S. Pat. No. 6,405,672 to evaluate the 'physical condition' of the herd. The activity of an animal is measured in documents including GB2058359, U.S. Pat. No. 6,104,294, WO2004/096044, WO03/055388 and EP0743043. Other systems include measurements of temperature U.S. Pat. No. 4,532,892, DE4025404 and DE19710342 or body position DE4227483 in order to detect illness or oestrus, or acceleration WO02/091001 as a measurement of activity.

A common system of identifying individual animals is using ID tags containing passive transponders, such as those disclosed in U.S. Pat. Nos. 4,617,876 and 4,532,892, wherein the transponder circuit is powered by an electromagnetic field from the receiver when in range. This method eliminates the need for the ID tag to carry a power supply, but restricts the use of the tag to a particular location. In U.S. Pat. No. 4,617,876 the system is triggered when an animal enters a stall comprising a weighing system. The ID tag is sensed and the weight of the animal is received by a computer means.

GB2297225 discloses a transponder system in which two-way communication is enabled. These systems also contain a means of identifying an animal whose tag is malfunctioning, resulting in an operated being alerted.

Various systems require active transmitters, such as in GB2058359, wherein the data collection unit stores signals relating to the movement of the animal then sends the data at periodic intervals to a receiver. EP808567 similarly discloses data logging apparatus for fitting to an animal that logs signals from movement sensors, and an onboard processor. Also included is a timing means to regulate when the onboard processing means commences and ceases.

Systems such as in WO98/47351 have a central 'large-size' computer that receives signals from smaller microprocessors which initially process the received sensor information. The sensors of this document include internal sensor devices that also have the ability to deliver a substance such as a vaccine. This document also proposes a central computerised database containing information about all cattle in the world.

Systems of displaying information recorded from animal sensors are generally disclosed in numerous documents, such as U.S. Pat. No. 4,617,876 and WO98/47351, wherein an operator may view information generated by the processors on a computer display.

The "health monitoring' system of U.S. Pat. No. 5,778,882 links sensors recording physiological information from one or more human patients, to a central database that communicates the information to other databases such as in a hospital or a physicians office for review. The data collected is general data that can be analysed to determine patterns that may indicate illness. The patient is required to manually connect the data logger to a data transfer device on a regular basis. The physician can communicate back to the patient using the same communication channels.

The system disclosed in US2002/010390 discloses the use of wireless relays to provide improved range and battery life by forwarding on the signals received from animals in a field. The receivers disclosed include any RF receivers and receivers linked to a network, such as a cellular phone network, or the internet. The aim of the transmission of the information is to alert an operator via a receiver, particularly via a portable device such as a PDA.

The document WO01/89368 discloses a health/caloric intake device for humans that is wrist-mounted and has the functions of data storage, data processing and data transmission and reception. The wrist-mounted device is configured to receive data from other sensors mounted on the person or devices via wireless transmission, such as Bluetooth. The data is then transmitted to an electronic display device, such as a computer, TV or PDA, or the data is transmitted to a remote computer system using the Internet for storage in a database or display to an authorised person.

The systems of the prior art that use passive sensors require substantial infrastructure to be installed and maintained for their use. They require a system of stalls wherein each has a communications system for activating the sensors and receiving the data.

Most of the systems that use active sensors that collect data periodically are limited by the potential to share and display the information collected, as it is only kept within a localised computer system. The system of U.S. Pat. No. 5,778,882 requires a human patient to manually connect the data logger to a transfer system, from where the data is transferred to a hospital database. The system of WO01/89368 has a combined data-logger and data-relay device which is worn by a human patient. The combined device is required to have a substantial battery in order to function, and has a transmission range and use limited by the battery.

Absent from the prior art is a system that can be used for monitoring non-human animals, that can automatically transfer data collected by data-loggers worn by the animal hosts, and that makes that data conveniently available to many people including animal health care professionals such as veterinarians, and the owners/caretakers of the animals.

OBJECT OF THE INVENTION

It is an object of the invention to provide an animal monitoring system that collects data regarding an animal and/or an animal's environment and enables access to the collected animal monitoring data, and/or to at least provide the public with a useful choice.

SUMMARY OF THE INVENTION

In one aspect the invention broadly consists in an animal-monitoring system, comprising:

a data-logger unit attached to an animal, wherein said data-logger unit logs data regarding the animal and/or the animal's environment;

a data-relay means in wireless communication with said data-logger unit;

a data-storage means in communication with said data-relay means, wherein data transmitted from said data-logger unit is relayed by said data-relay means to said data-storage means; and a website providing access to the data from said data logger stored on said data-storage means.

Preferably the data-logger unit comprises a self-contained power supply.

Preferably the data-logger unit stores the logged data in non-volatile memory.

Preferably the data-logger transmits the logged data at periodic intervals.

Preferably the data-logger unit is capable with of bi-directional communication with the data-relay means.

Preferably the data-relay means communicates with the data-storage means using wireless data transmission.

Preferably the data-relay means communicates with the data-storage means via a mobile phone network.

Preferably the data-relay means communicates with the data-storage means via the internet.

Preferably the data-storage means is a computer database server.

Preferably the data-storage means operates as the web-server hosting the website providing access to the data from said data logger stored on said data-storage means.

Preferably the data-logger unit logs data from one or more sensors selected from sensors capable of detecting movement, vibration, tilt, location, sound, temperature, light level, humidity, heart rate, breathing rate, and odour.

Preferably a collar attaches the data logger unit to the animal.

Preferably the data-relay means is a data-relay device suitable for connection to a domestic power-socket.

Preferably the data from the data logger stored on the data-storage means is analysed by a computer processor to determine the behaviour and/or activities of the animal.

Preferably the data from the data logger stored on the data-storage means is displayed on the website at least partially in pictorial form.

Preferably the pictorial form is animated.

Preferably the data-relay means is in wireless communication with a plurality of data-logger units.

In another aspect the animal-monitoring system is used for the diagnosing a medical condition of a monitored animal.

In another aspect the invention broadly consists in a website when adapted for displaying data from an animal-monitoring system comprising:

a data-logger unit attached to an animal, wherein said data-logger unit logs data regarding the animal and/or the animal's environment;

a data-relay means in wireless communication with said data-logger unit;

a data-storage means in communication with said data-relay means, wherein data transmitted from said data-logger unit is relayed by said data-relay means to said data-storage means for access by said website.

In another aspect the invention broadly consists in a kit of parts comprising:

a data-logger unit for attachment to an animal, wherein said data-logger unit is capable of logging data regarding the animal and/or the animal's environment; and a data-relay means capable of wireless communication with said data-logger unit, and communication with a data-storage means.

Preferably the data-relay means is capable of communication with a data-storage means via a mobile phone network.

BRIEF DESCRIPTION OF THE FIGURES

Preferred forms of the invention will now be described with reference to the accompanying figures in which.

DETAILED DESCRIPTION OF THE PREFERRED EMBODIMENTS

In reference to the figures, the preferred embodiments of the invention will be illustrated by way of non-limiting example.

Figure 1:
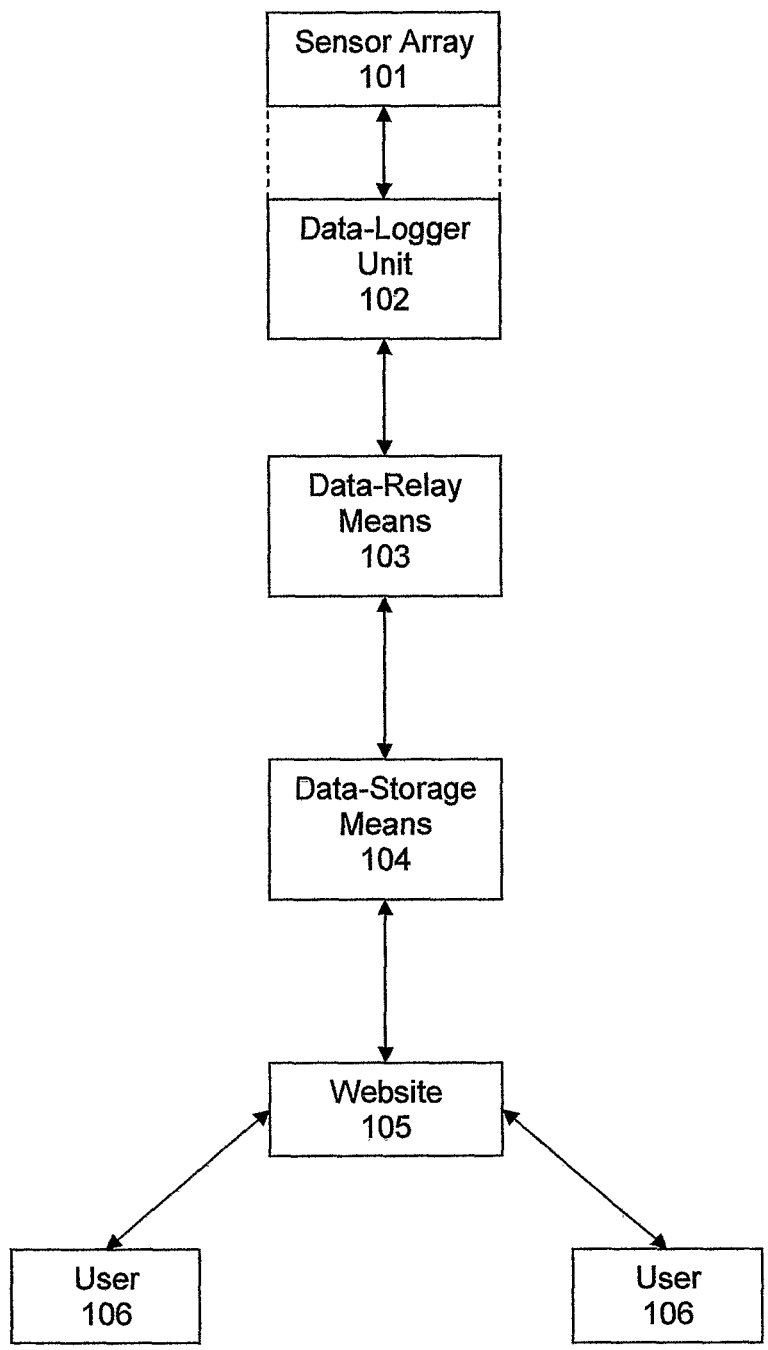
FIG. 1 shows a block-diagram of an example of the animal monitoring system.

As shown in FIG. 1, the animal-monitoring system generally comprises a data-logger unit 102, preferably worn by an animal host, communicating with a data-relay means 103. The data-logger unit preferably receives data from a sensor array 101 that collects information about the animal host and/or the animal host's environment. The data-relay means 103 communicates with a data-storage means 104 and relays the data from the data-logger unit 102. The data collected is then accessible from a website 105 by any number of users 106. Preferably the data-relay means is capable of communicating with a plurality of data-logger units that each collects information from an associated sensor array.

Although it is anticipated that the general invention as described has other uses, the preferred use of the invention is for animal health monitoring. More particularly, the invention relates to the use of non-invasive on-animal sensors to continuously and automatically observe and monitor an animal's behaviour and use this information to assess and detect and changes in well being. Used in association with off-animal sensors a detailed picture of the animals wellness status can be determined independently of the stockman or pet owner thereby providing objective and reliable data to animal health professionals. This invention relates to a means for capturing these data and making them available to animal health professionals in a convenient way without the need to be close contact with the animal.

It is known that animals display sickness behaviour, a syndrome of varying duration that precedes illness and manifests itself as a reduction in appetite and thirst, an increase in lethargy the onset of depression. Sickness behaviour precedes almost all infections and as such its detection would be a valuable means to alert the animal carer or handler to an impending change in health status. A combination of on-animal and off-animal sensors provides a time series of data that facilitates the automatic and continuous monitoring of the animal for signs of sickness behaviour or other changes in well being.

Veterinarians are reliant on pet owners for an anamnesis or feedback on the efficacy of prescribed treatments. Such feedback is commonly dependent on the unskilled assessment of clinical signs and is commonly subjective and incomplete. The animal-monitoring system of the present invention provides a means for veterinarians to access objective information independently of the owner or stock handler and to monitor animals using non-invasive methods while the animal is in its normal environment such as a paddock or in the owner's home. These data provide a history leading up to the first sign of the symptoms and would be a valuable adjunct to the physical examination for health professionals during the diagnosis process.

On-animal sensors can distinguish head shaking from other movements and as such are useful in monitoring the onset and treatment of ear infections. Dogs can show discomfort around their ears by scratching, rubbing their ears on the floor or furniture, or by shaking their head. If the infection reaches the middle ear, affected animals may have a head tilt and/or a lack of balance. From this example, it would be very advantageous for a pet owner for a vet to remotely be able to detect and be alerted of a possible ear infection in the animal before the infection reaches the middle ear.

In the case where a veterinarian prescribes an exercise regime for an obese pet, the veterinarian can only infer the level of activity from statements made by the owner. These statements are often vague and vary a great deal between owners making it difficult to compare measure between dogs and owners. The veterinarian cannot determine the activity of the animal from a visit to their practice as there is no historical time component to the visit. It would be very advantageous to be able to monitor the level of activity over time and make it available to the veterinarian.

Data-Logger Unit

Shown in FIG. 1, the animal monitoring system comprises a data-logger unit 102 attached to an animal that logs data regarding the animal and/or the animal's environment, preferably the data is gathered by an associated sensor array 101.

Suitable animals include but are limited to domestic pets, farm animals, wild animals and other mammals and reptilians. Suitable data logged by the data-logger on the animal host includes movement, vibration, tilt, location (including altitude), sound, temperature, light level, humidity, heart rate, breathing rate, odour, time and date, weight, food consumed, and water consumed. This data can be processed to assess changes in well being, medical status and mood etc).

Figure 2:
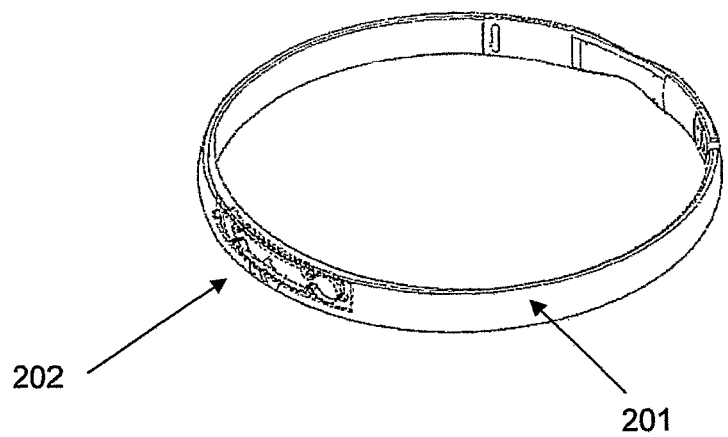
FIG. 2 shows a data-logger unit as part of an animal collar.

In a preferred aspect as shown in FIG. 2, the data-logger unit 202 is embedded in an animal collar 201 to protect the logger from the elements. In a preferred embodiment the sensor array forms part of data-logger unit 202. Preferably the data-logger includes a low voltage power source; a sensor array including sensors selected from tilt sensors, accelerometers, light sensors, and temperature sensors; logic circuitry; a timer; non-volatile memory; RF transceivers; and may also include an indicator means to signify the operational status of the data-logger.

In an alternative embodiment the sensor array may be configured as a separate component or separate components from the data-logger unit.

The preferred wireless transceiver uses low power 2.4 GHz that is available for public use under a general users license in most countries. The range of this transceiver is typically 30 to 60 meters which is suitable for most domestic applications. In a farm environment the transceiver can be fitted with a pre-amp that will extend its range. Nordic RF24L01 transceivers are suitable for this purpose as they have very low power consumption giving optimum battery life. This unit can also handle communication with multiple devices making it suitable for use in the data relay unit as well as the data logger.

It is a necessary requirement that wireless-communicating devices that are battery-powered should attempt to conserve power to maximize the duration(s) of communication connectivity, and minimize the duration, frequency, inconvenience and expense of any necessary battery recharging and/or replacement, thus the data-logger unit needs to be designed accordingly.

Preferably the data-logger unit must also be functional in close proximity to an animal and be able to withstand the rigours of the environment such as rain, insolation, moisture and submersion while the animal host is in water. To this end the circuits and power source are preferably protected by a housing or embedded in a substance to protect them from moisture and other external environmental hazards.

The data gathered from the host by these sensors are stored in the non volatile memory on the data-logger unit. At predetermined or intermittent times the data-logger unit sends the gathered data together with a time and date stamp by means of an RF transceiver to the data-relay means. A handshake occurs between the data-logger Unit and the data relay to establish that the data has been received and then the data stored on the data-logger unit is deleted. The data transmission protocol can be chosen from many different systems known in the art, including wireless LAN such as Wi-Fi, or inter-device transmission such as Bluetooth. Preferably a periodic direct RF transmission is used in order to conserve the battery of the data-logger unit.

If the data-logger unit is not within range of the data-relay means, such as when a pet is away, the logger stores the data in its onboard memory. When a data-relay means is detected the logger sets up a communication link and downloads the data to the relay unit. This is particularly important on farms when the logger can be some distance from the data-relay means. The data logger is able to store large amounts of data, but will start to overwrite the oldest data once the memory is full. Once a data-relay means is within range the logger-unit will download all the data into the flash memory of the data-relay means.

Means may also be provided to alert the user if an animal has not been in range of the data-relay means for a certain length of time. In a farm situation the data-relay means could be located at an area often visited by the animals being monitored, as a feed or water area, or a milking shed.

Preferably more than one data-logger unit can communicate with a data-relay means. Preferably each data-logger unit and each data-relay means have a unique identification number. Preferably plurality of animal hosts, such as a plurality of pets or a typical farm with many stock animals, each carrying a data-logger unit accumulating data can communicate with one data-relay means. Although more than one data-relay means may be required if the amount of data transferred is too great for one device, or if a larger transmission area needs to be covered.

Data-Relay Means

Figure 3:
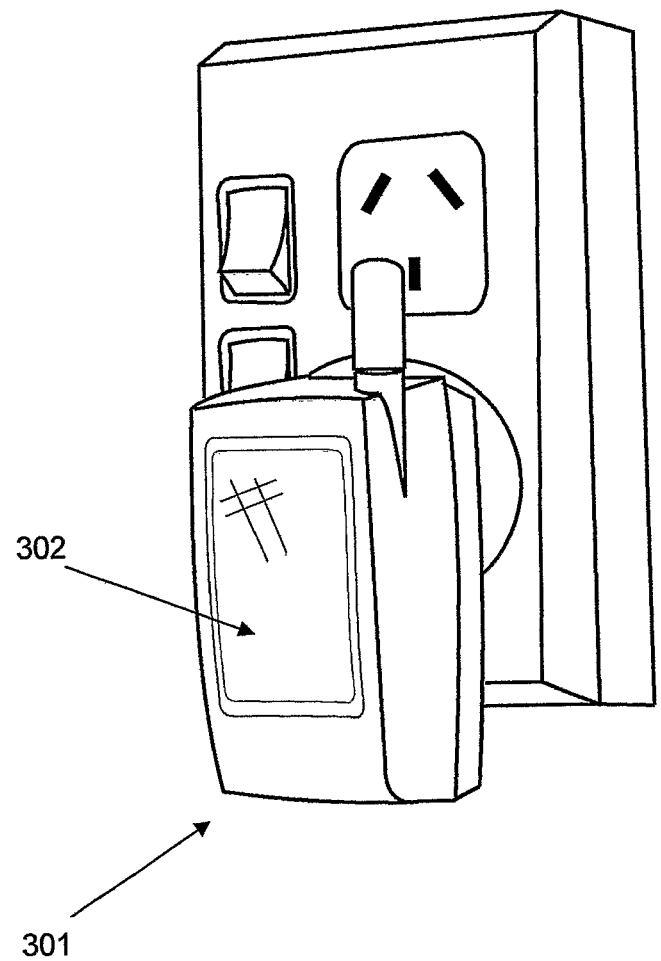
FIG. 3 shows a plug in wall-unit data-relay means.

Shown in FIG. 1, the data-relay means 103 is preferably located within the wireless communication range of the data-logger unit on the animal host. This would mean placing a data-relay means close to where an animal would sleep or in the corner of a paddock or on the side of a raceway used by farm animals. Preferably the data-relay means is mains powered and is plugged into a domestic mains power outlet. This allows the data-relay to use transmitters and receivers that use more power than would be appropriate for a battery powered system. A preferred embodiment shown in FIG. 3 is a plug-in wall-unit 301 that preferably also includes an LCD display 302.

Preferably the data-relay means includes a back-up power supply, such as a battery, for completing transmission and/or reception in a mains power-outage. In this embodiment the power outlet may be within wireless range of where the animal host with the data-logger unit normally sleeps.

Alternatively the data-relay means may be powered by a solar panel and batteries. The data relay means is in receive mode most of the time and is able to pick up a signal from the data-logger unit when it is active. This allows the data-logger unit to remain in a low power mode for long periods of time, thus extending the life of the batteries.

The data-relay means when in wireless communication with the data-logger unit stores the received data in memory, either volatile or non-volatile, preferably non-volatile memory. Preferably the data-relay means also collects data from any other external devices, such as from an animal feed or water station or a kennel or other housing means.

The data-relay means then relays the data to a central location that operates as a data-storage means. The data can be relayed immediately after or during receiving the data from the data-logger unit, or the data can be stored in memory and relayed at a later time. The time at when the data is relayed may be varied by the data-relay means depending on the availability of the communication means. If the communication means, such as an internet connection or a mobile phone network, is overloaded or otherwise unavailable, the data-relay means can hold the data in memory and transfer at a later time.

Preferably the data-relay means relays the data to the data-storage means using a cellular/mobile communication network using a cellular modem such as the Q24PL003 modem module from Wavecom. The cellular modem can be of any appropriate system such as GPRS or CDMA, depending on the preferred cellular network of the region in which the communication unit is to be used. In one embodiment the data-relay means uploads the data collected to an FTP site using the cellular network. The cellular communication ability may also be used to relay information directly to the user of the system. A message, particularly an urgent message may be sent to the user's cellular phone, such as an SMS message or voice message, to inform the user or alert of an important event.

In another embodiment the data-relay means communicates directly to a PC via an external port, such as USB or RS232, or over a network such as a Local Area Network, or a wireless LAN, to a computer system that can operate as the data-storage means or as a gateway to the internet or another external network for storage and/or use of the data.

Alternatively the data-relay can communicate to an external modem, such as a cellular modem or ADSL or DSL modem, either directly or over a computer network, such as LAN or wireless LAN. The external modem can then communicate with the data-storage means.

The data-relay means may be fitted with an indicator means to show operational status of the data-relay and/or that of the data-logger units. The indicator means could indicate that the data-relay is operational, is transmitting or receiving data or that a data-logger unit is in or out of wireless range. The indicator means may be visual such as an LED or LCD display, such as in FIG. 3, and/or it may use sound such a piezo sound generator.

Data-Storage Means

Shown in FIG. 1, the data-storage means 104 is preferably a computer database server that essentially operates as a central location for the storage, retrieval, processing and display of the data from the data-logger units. The collected data is processed and stored in virtual files, accessible by one or more web servers hosting a website for displaying the collected data in its processed form. The data-storage means, as a database server, may also operate as the web server for hosting the website.

The central location can also relay information back to the data-relay means which can be relayed to the data-logger unit. Such data can include but is not restricted to time data to synchronise the data-logger unit time, and data to determine the times and frequency that the logger unit transmits data to the wait unit, or other data to update the operation of the data-relay means and/or the data-logger units.

Preferably the data stored on the data-storage means is analysed by a computer processor to determine from the data from the data-logger unit the behaviour and/or activities of the animal. The behaviour and activities that can be determined include the physical activity of the animal, such as how much it is moving around, or specific activities such as scratching or eating. The behaviour of the animal may be determined by the physical activities of the animal in conjunction with the data regarding the environment around the animal. Such as if the animal is sleeping during the day or night, or inactive or active during hot weather, and the like.

The Website

As indicated in FIG. 1, the analysis of the collected data is displayed on the website 105, which can be accessed by users of the system 106, being appropriate people or other services, such as the owner/caretaker of the animals or a veterinarian. The nature of the internet potentially allows access to the information from anywhere with an internet connection. Thus a veterinarian with particular expertise does not necessarily need to visit the animal or animals onsite when the appropriate data for a diagnosis or prognosis is available on the website. A central animal health service may also access the website in order to track the location and health of individual animals, such as cattle, for purposes of tracking and controlling potential disease outbreaks.

In one embodiment the website may be configured as a central website for all or many users of the animal monitoring system, wherein the users log into the website to access the data and/or stored information of certain animals. Preferably the users must use a password to gain access. Preferably the connection to the website is a secured connection using encryption.

Depending on the requirements of the users, the information displayed or accessible to different users may be different when viewing details of the same animal.

In an alternative embodiment each user or associated group of users may have their own website for their own use.

The analysed data may be displayed on the website in a number of ways, such as raw data from the sensors as text, or as pictorial data such as graphs and diagrams of animal behaviour and activity, wherein the pictorial representations may be animated. Other aspects of the data may be provided on the website, such as sound data recorded by the sensors, or messages or notes regarding animal/s left by other users of the website such as veterinarians.

In another aspect the website may be used as a portal for a user to download data for later use.

The invention claimed is:

1. An animal-monitoring system, comprising:
    a data-logger unit attached to an animal, wherein said data-logger unit logs data regarding external bodily movement of the animal, and wherein said logged data is stored in non-volatile memory;
    a data-relay means in wireless communication with said data-logger unit, wherein said data-logger unit accumulates logged data when out of range with said data-relay means, and intermittently transmits logged data when in range of said data-relay means;
    a data-storage means in communication with said data-relay means, wherein data transmitted from said data-logger unit is relayed by said data-relay means to said data-storage means and wherein the data is used to assess the health of the animal based on external bodily movements of the animal; and a website providing access to human users so they can obtain information relating to the data from said data logger stored on said data-storage means.

2. The animal-monitoring system of claim 1, wherein the data-logger unit also logs data regarding the animal's environment and such data is used in combination with the data logged regarding the animal's external bodily movements to assess the health of the animal.

3. The animal-monitoring system of any one of claims 1 and 2, wherein the data logged regarding the external bodily movements relates to at least one of scratching, tilt and vibration of the animal.

4. The animal-monitoring system of claim 2, wherein the data regarding the animal's environment relates to at least one of the location, temperature, light level and humidity of such environment.

5. The animal-monitoring system of claim 1, wherein the data-logger unit is capable of bi-directional communication with the data-relay means.

6. The animal-monitoring system of claim 1, wherein the data-relay means communicates with the data-storage means using wireless data transmission.

7. The animal-monitoring system of claim 1, wherein the data-relay means communicates with the data-storage means via a mobile phone network.

8. The animal-monitoring system of claim 1, wherein the data-relay means communicates with the data-storage means via the internet.

9. The animal-monitoring system of claim 1, wherein the data-storage means is a computer database server.

10. The animal-monitoring system of claim 1, wherein the data-storage means operates as the web-server hosting the website providing access to the data from said data logger stored on said data-storage means.

11. The animal-monitoring system of claim 1, wherein the data logger unit logs data from one or more sensors selected from sensors capable of detecting movement, vibration, tilt, location, sound, temperature, light level, humidity, heart rate, breathing rate, and odour.

12. The animal-monitoring system of claim 1, wherein a collar attaches the data logger unit to the animal.

13. The animal-monitoring system of claim 1, wherein the data-relay means is a data-relay device suitable for connection to a domestic power-socket.

14. The animal-monitoring system of claim 1, wherein data from the data logger stored on the data-storage means is analysed by a computer processor to determine the behaviour and/or activities of the animal.

15. The animal-monitoring system of claim 1, wherein the data from the data logger stored on the data-storage means is displayed on the website at least partially in pictorial form.

16. The animal-monitoring system of claim 1, wherein the pictorial form is animated.

17. The animal-monitoring system of claim 1, wherein the data-relay means is in wireless communication with a plurality of data-logger units.

18. The use of an animal monitoring system of claim 1 for the diagnosing of a medical condition of a monitored animal.

19. An animal-monitoring system, comprising:
   a data-logger unit attached to an animal, wherein said data-logger unit logs data regarding:
      (a) external bodily movement of the animal;
      (b) the environment surrounding the animal; and
      (c) bodily functions of the animal;
   wherein said logged data is stored in non-volatile memory;
   a data-relay means in wireless communication with said data-logger unit, wherein said data-logger unit accumulates logged data when out of range with said data-relay means, and intermittently transmits logged data when in range of said data-relay means;
   a data-storage means in communication with said data-relay means, wherein data transmitted from said data-logger unit is relayed by said data-relay means to said data-storage means and wherein the data is used to assess the health of the animal based on items (a), (b) and (c);
   and a website providing access to human users so they can obtain information relating to the data from said data logger stored on said data-storage means.

20. A kit of parts adapted for use in the animal monitoring system of claim 1, the kit of parts having the data-logger unit, the data-relay means and the data-storage means.

21. An animal monitoring system according to claim 19, wherein the external bodily movement of the animal comprises one or more of head tilt and scratching.

22. An animal monitoring system according to claim 19, wherein the data logged by the data-logger unit comprises one or more of temperature, light level and humidity.

23. An animal monitoring system according to claim 19, wherein the bodily functions comprise one or more of the animal's sound, heart rate and breathing rate.

24. The kit of parts of claim 20, wherein the data-relay means is capable of communication with a data-storage means via a mobile phone network.

\* \* \* \* \*